Sept. 20, 1932.   A. E. SPINASSE   1,878,906
APPARATUS AND METHOD FOR DRAWING GLASS
Original Filed July 5, 1927

Inventor
Arthur E. Spinasse

Patented Sept. 20, 1932

1,878,906

UNITED STATES PATENT OFFICE

ARTHUR E. SPINASSE, OF MOUNT VERNON, OHIO, ASSIGNOR TO PITTSBURGH PLATE GLASS COMPANY, A CORPORATION OF PENNSYLVANIA

APPARATUS AND METHOD FOR DRAWING GLASS

Original application filed July 5, 1927, Serial No. 203,488. Divided and this application filed November 23, 1929. Serial No. 409,401.

The present invention relates to improvements in the art of drawing continuous sheet glass from a bath of molten glass, and has for its primary object the arrangement of parts to prevent the crystallization of glass at the surface of the bath in proximity to the source of the sheet or plate glass being drawn. Also the improvement of means and method for supplying a cooled portion of anchored glass of substantially uniform viscosity throughout from which a flat sheet of glass may be drawn freer or devoid of wavy defects, lines or similar blemishes.

I have already disclosed in my Patent No. 1,336,056, granted to me April 6, 1920, in Figure 20 of the drawing of said patent a form of wedge slab submerged within the bath beneath the source of the article being drawn, but with a flat upper surface. I have improved upon this structure to the extent of better controlling and regulating the temperature and viscosity of the molten glass which passes over and about or through the slab.

Another object of the invention is to provide an improved anchorage and insure uniformity in the thickness of the article or sheet glass being drawn.

The above and various other objects and advantages of this invention will be described in and understood from the following detailed description of the present preferred embodiments thereof and the improved method or process of practicing the invention, the embodiments being illustrated in the accompanying drawing, wherein:—

Figure 1:
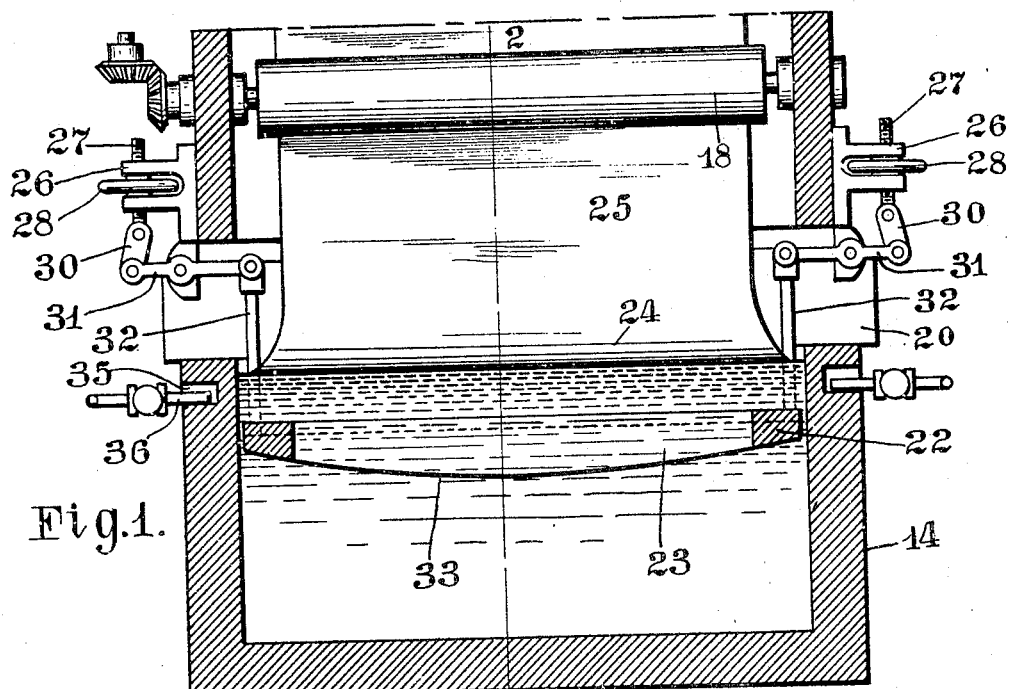
Figure 1 is a transverse section taken through a forehearth of a glass furnace at the line of the draw, showing a longitudinal section through the improvement of this invention mounted therein and in relation to a sheet of glass being drawn.
Figure 2:
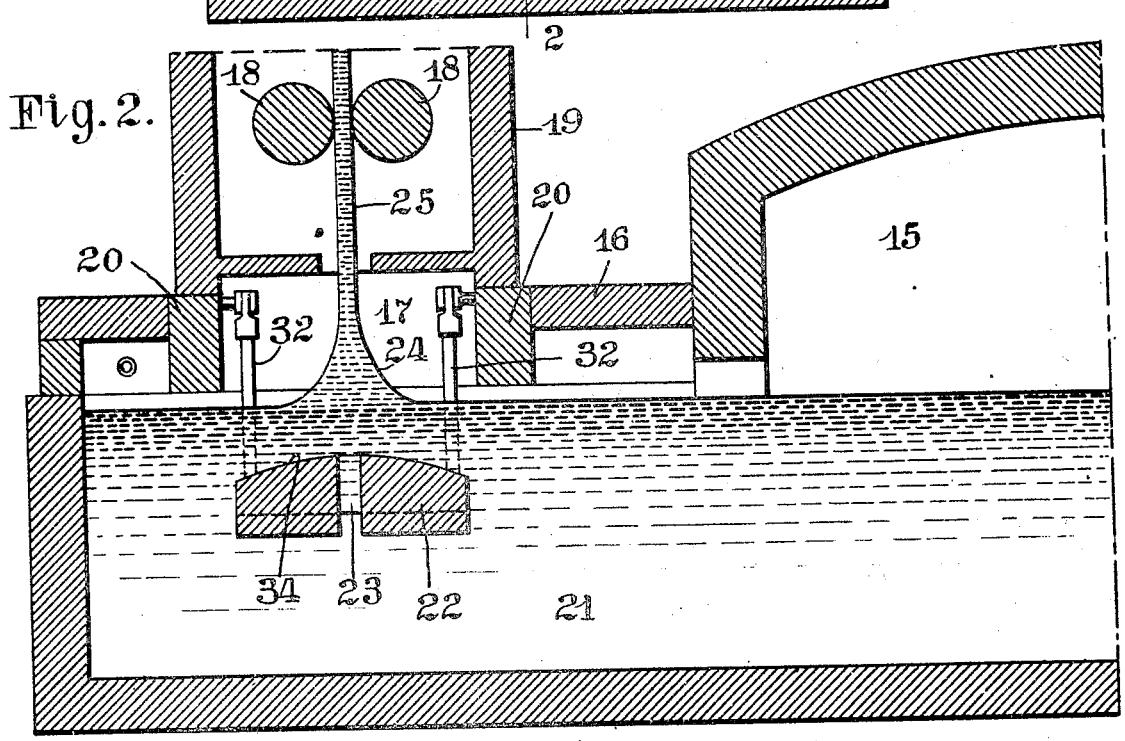
Figure 2 is a longitudinal section taken substantially on the line 2—2 of Figure 1, and showing the melting tank in communication with the drawing forehearth and also a transverse section through the improvement of this invention mounted therein.
Figure 3:
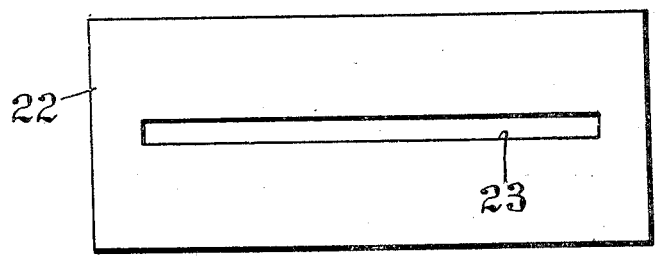
Figure 3 is a top plan view of the temperature controlling and anchoring slab employed.

Referring to Figures 1 to 3 of the drawing, 15 designates a glass melting tank in communication with the forehearth 16, the roof of which has an elongated drawing opening 17 transversely thereof, and above which is disposed the sheet drawing means 18 within the leer 19. Shields 20 are disposed spaced just above the surface of the bath 21 at the opposite side of the sheet glass being drawn through opening 17.

Located in the bath 21 is a slab 22 which in the present instance is shown as of oblong or rectangular shape, and which may or may not be provided with a central slot opening 23 extending vertically throughout the height of the slab and longitudinally throughout substantially the length of the slab. Such an opening when used, assists in commingling the different portions of the glass which pass therethrough to or from the source of the drawn sheet.

The upper surface of the slab, as shown in Figure 2, is convexly curved from side to side only so as to gradually and uniformly control the cooling of the molten glass flowing about and over each side of the upper surface of the slab and as the glass merges into the meniscus 24 of the sheet of glass 25 being drawn.

The curvature of the upper surface of the slab 22 extends to the side edges thereof and may be of desired degree to provide a smooth and uninterrupted symmetrical surface to effect the gradual and uniform cooling and anchoring of the layer of molten glass as it enters the anchoring area and merges into the meniscus forming the sheet.

With this improved structure, the slab may be tilted sideways without materially disturbing the depth of the glass layer at each side of the meniscus being drawn on account of the gradual transverse curvature of the upper surface of the slab, thereby maintaining uniformity of anchorage for the base of the forming sheet during the drawing operation.

The lower surface of the slab, as shown in Figure 1, is also preferably longitudinally convexly curved substantially from end to end to thereby better compensate for variation in temperature in the glass bath gradually and uniformly from the middle portion toward the end portions thereof.

It will be clear, from the above, that in this case the curvature of the upper surface 34 of the anchoring slab is substantially at right angles to the curvature of the bottom surface 33 thereof.

The slab 22 is maintained in a totally submerged position in the bath 21 by any suitable means, such as the means illustrated. In Figures 1 and 2 the end walls of the leer 19 are utilized for supporting brackets 26, and each bracket has mounted therein a vertically slidable shaft 27 upon which is threaded a hand wheel 28 held against vertical movement by the arms of the bracket 26. The shaft 27 is connected by a pivoted link 30 to an arm pivoted in the lower end of the bracket 26 and projecting through the walls of the leer 19. Pivotally suspended upon the inner end of the arm 31 is a refractory rod 32 adapted at its lower end to bear against the upper surface of the submerged slab 32.

The slab adjusting devices may be disposed not only at each end of the slab but also at opposite corners thereof, as shown in Figure 2, so that the slab may be adjusted to any desired position or depth entirely submerged beneath the surface level of the bath. This adjustment of the slab 22 permits the desired free surface layer flow of the molten glass from the tank or forehearth 16 over the upper surface of the slab 22 and beneath the shield 20 to the source of the meniscus 24 of the sheet of glass 25 being drawn; thereby minimizing the tendency to the devitrification of the glass at the drawing area.

The slab 22 is submerged to a greater or less extent in the bath to regulate the gather of the meniscus of the sheet. The slab 22 is positioned to form a relatively shallow layer of cooler glass above the upper surface of the slab adjacent the meniscus. If the relatively thin layer produces imperfections in the drawn sheet, the slab 22 may be further submerged.

The lateral dimension of the slab 22 is such that it extends at opposite sides beyond the lateral base of the meniscus for conditioning the surface layer gradually and evenly, as it travels toward the meniscus of the glass article or sheet being drawn. In drawing the glass sheet the slab is submerged beneath the meniscus in register centrally therewith and in such position that the surface layer is gradually and uniformly cooled to the correct viscosity throughout its path of travel.

The slab 22 may be tilted more or less so as to depress its front or rear edge to equalize the surface tension at each side of the meniscus to maintain the same in desired central position in the drawing opening 17, and above passage 23 in the slab.

It will be understood, in a furnace of this type, that the glass bath will be maintained at the customary substantially constant or uniform level. As shown in Figure 2, the meniscus 24 is drawn from the free surface of the bath and from the shallow layer of glass above the segregating member 22, and with the base of the meniscus in line with the slot 23. The fact that the segregated layer is entirely free at its sides and the upper or lower surface of the segregating member being convex, a better regulation of the glass supply to the sheet source is maintained and greater uniformity of thickness in the sheet secured as the opposite sides of the meniscus move upwardly in closer relation to form the sheet.

The walls of the receptacle may be provided with channels 35 extending adjacent the source of the drawn sheet edges, with means such as pipe and valve 36 for supplying a temperature controlling element thereto to counteract the narrowing tendency of the sheet during drawing.

In practicing the process it will be noted that the lower portion of the partially segregated long narrow layer of glass is transversely concavely curved but is of substantially the same shape throughout its length. This assists greatly in preventing the formation of abnormal cooler areas of glass at the end portions of the layer, while the above referred transverse curvature of the layer lower portion effect a more uniform distribution of the glass being drawn in the rising meniscus which forms the sheet.

The sides of the rising meniscus are also drawn from the free surface of the glass bath and in line above the thus shaped layer of the bath while the inner longitudinal portion of the meniscus may also be drawn above a deep portion of the bath. The dominating anchorage effect imparted to the drawn glass is thus promoted at the sides of the forming meniscus and greater flexibility in the supplying movement of the glass is maintained in the central portion of the rising meniscus, all of which tending to produce a final sheet of improved quality.

The present application for patent is a division of my prior application, filed July 5, 1927, Serial No. 203,488.

It is obvious that various changes and modifications may be made in the details of construction and design of the above specification or specifically described embodiment of this invention without departing from the spirit thereof, such change and modifications being restricted only by the scope of the following claims.

What is claimed is:—

1. An anchoring and temperature controlling slab for use in drawing a sheet of glass from a molten bath, comprising a solid body adapted to be submerged in a bath of molten glass beneath the meniscus of an article or sheet to be drawn, said body having an upper surface which is transversely convex and longitudinally straight and a lower surface which is longitudinally convex and transversely straight.

2. An anchoring and temperature controlling slab for use in drawing a sheet of glass from a molten bath, comprising a solid body adapted to be submerged in a bath of molten glass beneath the meniscus of an article or sheet to be drawn, said body having an upper surface which is transversely convex and longitudinally straight and a lower surface which is longitudinally convex and transversely straight, said body having a vertical slot therethrough extending longitudinally of its central portion.

3. An anchoring and temperature controlling slab for use in drawing a sheet of glass from a molten bath, comprising a solid body adapted to be submerged in a bath of molten glass beneath the meniscus of an article or sheet to be drawn, said body having an upper surface which is longitudinally straight but which tapers upward from the sides of the body to its central portion and a lower surface which is transversely straight but which tapers downward from the ends of the body to its central portion.

4. An anchoring and temperature controlling slab for use in drawing a sheet of glass from a molten bath, comprising a solid body adapted to be submerged in a bath of molten glass beneath the meniscus of an article or sheet to be drawn, said body having an upper surface which is longitudinally straight but which tapers upward from the sides of the body to its central portion and a lower surface which is transversely straight but which tapers downward from the ends of the body to its central portion, said body having a vertical slot therethrough extending longitudinally of its central portion.

In testimony thereof, I affix my signature.

ARTHUR E. SPINASSE.